Patented Oct. 26, 1937

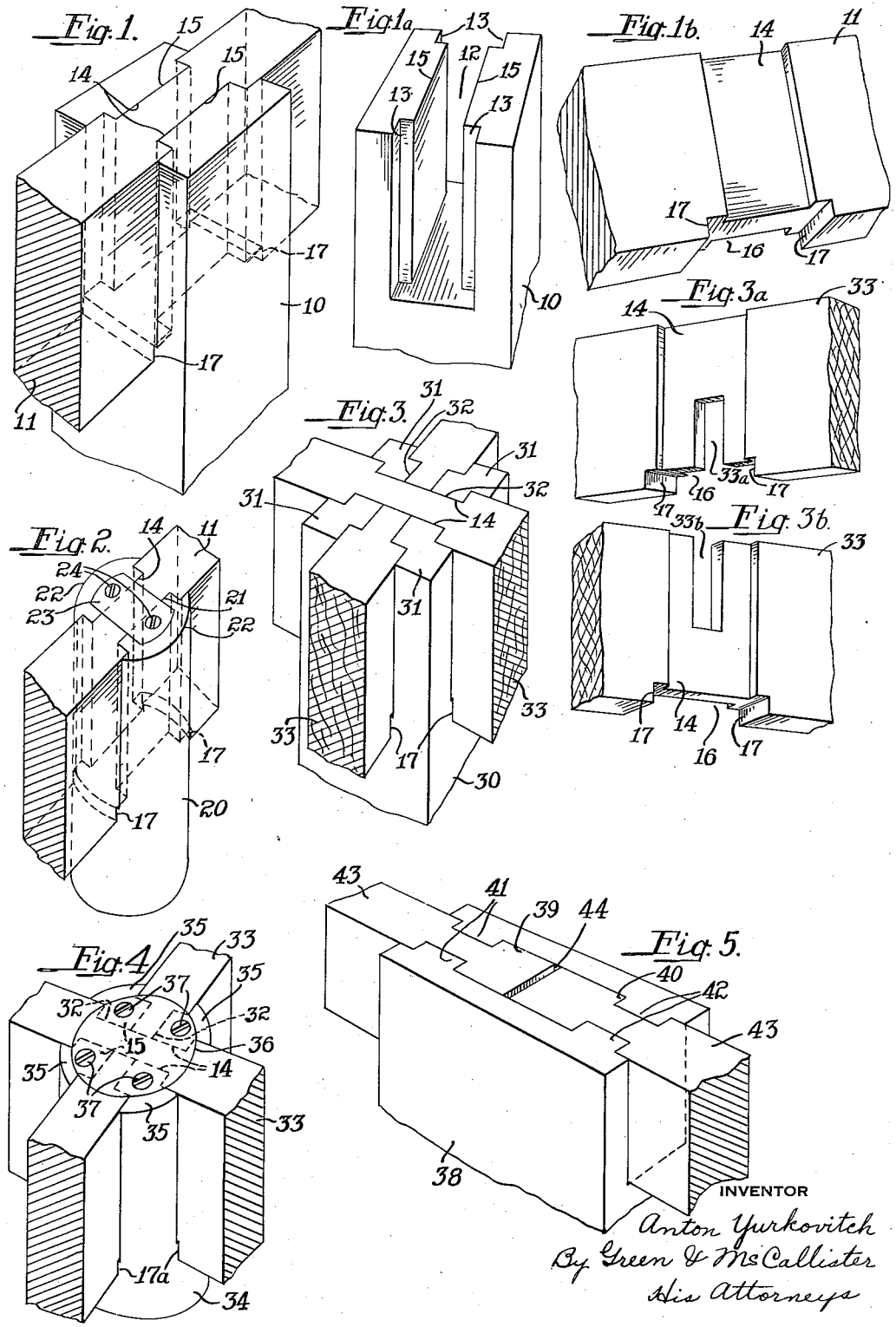

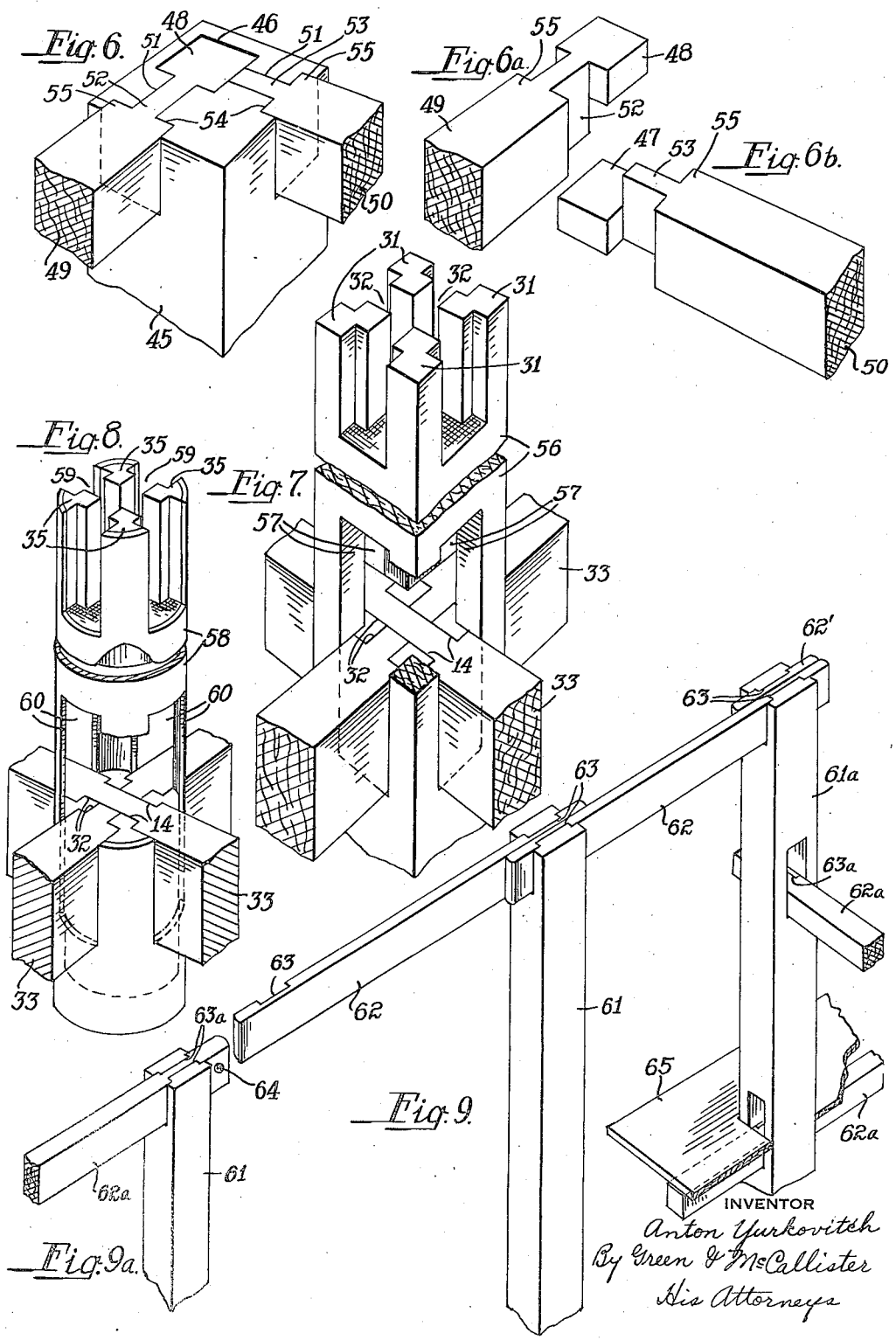

2,097,172

UNITED STATES PATENT OFFICE 2,097,172

INTERLOCKING JOINT CONSTRUCTION

Anton Yurkovitch, Pittsburgh, Pa.

Application March 10, 1937, Serial No. 130,037

9 Claims. (Cl. 20—92)

My present invention relates to locking devices and to an interlocking joint construction having a wide variety of uses; more particularly the invention concerns wood or metal joints which can be readily assembled and disassembled without the use of auxiliary fastening instrumentalities.

Many efforts have been made in the past to produce joints or constructions of the general type here involved but insofar as I am aware such have suffered from recognized defects and disadvantages. In the first place, the material was excessively cut away or weakened, thus limiting the applicability thereof to circumstances where only relatively slight weights or stresses were encountered; in the second place, in trying to keep the joints of simple construction they have been so made that they come apart too easily, particularly in the case of wooden joints after shrinkage or drying of the wood; in the third place, prior constructions have been such that they tended too readily to shear off and in the fourth place, conspicuous joints or spaces were produced which were unattractive in appearance. In general, the prior constructions were unduly limited as to their applicability and utility.

It is one of the objects of my present invention to produce a wood or metal joint which has unusual qualities of strength and appearance and which at the same time is capable of being readily disassembled and reassembled for the most part without the use of any fastening instrumentalities, such as dowels, nuts, screws, nails, bolts, glue and the like.

Another object of my invention resides in the production of an interlocking joint construction wherein such joint fully retains its qualities of usefulness and ornamentality, even after (when wood is used) the wood dries or shrinks.

A further object of my invention resides in the production of interlocking joints adapted for a variety of articles which are readily demountable and which in one form or another are adapted for a wide variety of uses.

A still further object of my invention resides in the provision of joint constructions having the structural and functional advantages and details hereinafter to be described and in such other and further objects and advantages as will be understood by those skilled in this art.

In the accompanying drawings wherein similar numerals designate similar parts throughout the various views:

Figure 1 is a perspective view of one form of interlocking joint construction embodying my present invention.

Figs. 1a and 1b illustrate in perspective the individual joint parts shown assembled in Fig. 1.

Fig. 2 is a perspective view of a modified form of joint construction embodying my present invention.

Fig. 3 is a perspective view illustrating a further modification of the invention and wherein two crossing locking elements are utilized.

Figs. 3a and 3b illustrate in perspective the individual crossing locking members of Fig. 3.

Fig. 4 is a view similar to Fig. 3 but wherein one member is round instead of rectangular in cross-section.

Fig. 5 is a perspective view of another embodiment of the invention adapted for connecting rails or extensions and wherein the individual locking elements do not cross or abut each other.

Fig. 6 is a perspective view of another form of the invention wherein the individual locking elements meet and interfit but do not cross.

Figs. 6a and 6b illustrate in perspective in proper relationship the individual locking elements of Fig. 6.

Fig. 7 illustrates a composite form of the invention wherein a joint such as that of Fig. 3 can be applied not only to the top of a rectangular member but intermediate the ends thereof.

Fig. 8 illustrates a modification of Fig. 7 as applied to a metal pipe, tube or the like; and Figs. 9 and 9a illustrate in perspective another form of the invention which is capable of being built up in a number of different ways to produce various demountable articles therefrom.

First referring to my invention in a general manner, I wish to point out that it provides a new and improved interlocking joint which makes the construction of a variety of articles much more practical and serviceable and at the same time represents a great advantage to buyers or users thereof. Broadly speaking, my interlocking joint construction herein disclosed is applicable to those articles having or standing upon legs or feet or articles which have attachments on the top or intermediate the ends thereof. The invention provides means whereby one, two, three or more parts, elements or articles can be firmly and tightly held together while being at the same time readily separable or demountable. The invention also applies to joint constructions which are made out of wood, metal, part wood and part metal, alloys, compositions and other suitable material having requisite properties for any given use. My invention at the same time eliminates completely the use of dowels, screws, bolts, nails, glue, etc., although as will be hereinafter pointed out in connection with Figs. 2 and 4 particularly, an auxiliary metal plate may be screwed in place for certain purposes if so desired although it is to be understood that the invention is not dependent upon the use of such. Articles having joints constructed in accordance with my present invention are particularly easy to repair and at the same time replacement of parts when such becomes necessary or desirable results in a minimum of trouble and expenditure. The construction has the particular advantage that there are no holes necessarily produced therein due to the use of fastening instrumentalities.

In the drawings, the embodiment of the invention shown in Figs. 1, 1a and 1b comprises a receiving member 10 and an interlocking member or element 11. The receiving member 10, which may be made either of metal or wood or of some suitable composition or alloy and which may, as shown, be of rectangular cross-section, is provided in its upper end with a slot or groove 12 passing entirely through the member. This slot has rabbeted portions 13 which provide for increased width of the slot at its ends and the formation of a plurality of shoulders forming seats for receiving the interlocking member. The interlocking member 11 which also may be made of metal, wood or some composition or alloy, is provided on each side with a vertical flat bottomed recess 14 which is adapted to interfit with and receive the projecting portions 15 of the receiving member 10. The bottom surface of the interlocking member is also cut out, as shown, in Fig. 1b, to form a longitudinal recess 16 at right angles to the first named recesses 14 and in such manner as to provide the depending portions 17. When now the parts of Figs. 1a and 1b are assembled as shown in Fig. 1, it is clear that the portions 15 of Fig. 1a are received in the recesses 14 of Fig. 1b and that the flat surface of recess 16 of Fig. 1b rests upon the bottom of slot or groove 12 of Fig. 1a while at the same time the depending portions 17 assume the position shown in Fig. 1 wherein they not only cover the sides of the joint so produced but snugly engage the sides of the receiving member, the proportions being such as to effect this and such materially adds to the strength and appearance of the joint.

Attention is called to the fact that the parts are snugly interfitting in Fig. 1 and changes in the material resulting from varying temperature, humidity, etc., conditions causes the parts to change proportionately in response to these conditions, thus always maintaining the same relationship throughout their effective life. Whether the invention shown in Fig. 1 is used in the position shown or inverted, i. e., to form a foot, support or the like, the joint has adequate strength for all reasonable service to which it may be subjected. At the same time the interlocking member 11 can be removed when desired and can be replaced by a new member or a different member in accordance with requirements of use.

In Fig. 2 the embodiment therein shown is similar to that of Fig. 1 except that the receiving member 20 is circular in cross-section and accordingly when centrally slotted at 21 in the manner of Fig. 1 produces two substantially planoconvex rabbeted portions 22. The interlocking member of Fig. 2 is identical with that of Fig. 1, as indicated by the use of the same numerals, and the only other difference between Fig. 2 and Fig. 1 is that in Fig. 2 the bottom surface of the members is slightly recessed to form a seat for a metal plate 23 which is shown in place thereon and which is further secured in place by the screws 24. Plate 23 is flush with the bottom of the joint. This metal plate may be optionally used in this or any of the other joints shown where it is probable either that the article will not be knocked down or taken apart for a considerable length of time or where from the particular circumstances of use a semi-permanent structure is preferred or required.

Figs. 3, 3a and 3b disclose a form of the invention wherein two interlocking members are provided which cross or intersect each other. In this case the receiving member 30 is so rabbeted or cut away in its end as to leave four corner members 31 of the particular shape shown similar to two diamond-shaped pieces merging at a common apex. These four corner pieces in effect provide two slots 32 through the member 30, each of which is similar to the slot 12 described and the two slots being arranged at right angles to each other. Each of the interlocking members 33 is on the whole very similar to the interlocking member 11 shown in Fig. 1b, as is evidenced by the use of certain corresponding numerals but the interlocking member of Fig. 3a has a slot 33a in the recessed portion 14 which extends from the bottom thereof to a point about half way to the top thereof while the slot 33b in the interlocking element of Fig. 3b extends from the top downwardly, the slot 33a in the member of Fig. 3a being approximately equal in height to the unslotted portion of Fig. 3b and the unslotted portion of Fig. 3a being approximately equal in height to the slotted portion of Fig. 3b so that the two register and interfit, as will be clearly understood from Fig. 3, at right angles to each other. The construction of Fig. 3 has some advantages over that of Fig. 1 in that it forms a more rigid and less easily displaced joint while retaining the advantages of Fig. 1 as to simplicity, demountability and other mentioned qualities.

In the modification shown in Fig. 4 the construction there illustrated bears the same relative relationship to Fig. 3 that Fig. 2 bears to Fig. 1; in other words, in Fig. 4 the receiving member 34 is of circular cross-section, thus providing after rabbeting or cutting away the material of the member as in Fig. 3, four corner pieces 35 having a convex outer end. The interlocking members 33 are identical with those set forth in Fig. 3 except that the depending portions 17' of Fig. 4 are concaved so as to snugly engage the convex surface of the member 34 below the slots 32 therein. In Fig. 4 also the members are cut away to form a seat for a circular metal plate 36 which is secured in place by means of the screws 37, the function and significance thereof being already described in connection with the plate 23 of Fig. 2.

The joint construction illustrated in Fig. 5 is of such a nature as to permit the demountable fastening of rails, extensions and the like to an upright member and where it is not desired to have the ends of such rails or extensions abut, overlap or intersect. In Fig. 5, therefore, the receiving member 38 is cut out in its top so as in effect to provide two longitudinally contiguous slots or grooves 39, 40, each of which is similar to that shown in Fig. 1a, for instance, except that the proportions are different. In other words, the receiving member 38 of Fig. 5 is so cut out as to produce two sets of projecting portions 41, 42 formed by appropriately cutting away the material in the top of the member. Each interlocking member 43 is of somewhat H-shape near one or both ends thereof and provided with portions so cut away as to be complemental to the receiving member. This involves forming two grooves or flat-bottomed recesses in each of the locking members so as to make a sliding engagement with said receiving member. This will be understood from Fig. 1b especially. It will be noted that there is a slight clearance 44 between the adjacent ends of the two members 43 and I have found that this is desirable to prevent binding or jamming particularly when angular stresses are encountered. The size of the clearance may, however, be varied as desired.

In Figs 6, 6a and 6b I have illustrated another form of the invention which I have found to be highly advantageous for special purposes such as where the joint itself is required to be as inconspicuous as possible because when the parts of Fig. 6 are correctly and carefully made the joint is very nearly invisible. In these figures the receiving member 45 which may be made of wood, as shown, is cut out in such manner as to receive the interlocking members shown in Figs. 6a and 6b. For this purpose the receiving member is provided with a rectangular corner cut out portion 46 substantially equal in depth to the combined heights of portions 47 and 48 of the interlocking members 49 and 50. Extending from this cut out portion 46 are the two groove-like cut away portions 51 disposed at right angles to each other and equal in depth to the height of portions 52 and 53 of the interlocking members. The receiving member is also cut out as shown in Fig. 6 so as to provide seats or recesses 54 adapted to receive the portions 55 of the interlocking members proper. In actuality, the locking members of Figs. 6a and 6b are identical but one (that of Fig. 6b) is used in inverted position and the other (that of Fig. 6a) is used in normal position. Thus these interlocking members together exactly fill up the cut away portions in the receiving member and at the same time provide a joint which is not only inconspicuous but which is actually very strong in proportion to the amount of material present in it and where the interlocking members and/or the receiving member are made of metal sufficient strength exists in the members even for extraordinarily severe usage.

In Fig. 7 I have illustrated how the embodiment of Fig. 3 can be used to make connection not only with the top of a receiving member but with such member intermediate the top and bottom thereof. The receiving member 56 of Fig. 7 is cut away in its upper surface or end in exactly the same manner as Fig. 3, hence the same numerals are there used. However, the receiving member of Fig. 7 is also cut out intermediate its ends so that the same interlocking members can be used in such other locations or if desired two sets of interlocking members may be provided and used simultaneously in both places depending upon the particular requirements of use in a given case. Referring to such intermediate portion of Fig. 7, it will be seen that four "windows" 57 are cut in the material and that these extend through the material of the member to provide a space or aperture therethrough of sufficient height to accommodate the interlocking members 33. Below such space or aperture the receiving member is again cut away exactly as at the top of the said member, as indicated by the use of similar numerals. In assembling the interlocking members in the lower position shown in Fig. 7, the interlocking member which corresponds to that of Fig. 3b is first placed through the space in the member and then slid downwardly into locking position and then the other interlocking member 10 like that of Fig. 3a is inserted at right angles and slid down until the positions shown in Figs. 3 and 7 are reached. It is to be understood, however, that while the interlocking members in Fig. 7 are not shown with depending portions 17 they can be so made if desired or preferred.

In Fig. 8 I have illustrated the adaptation of the form of the invention shown in Fig. 4 to the features of Fig. 7. While basically like Fig. 7, Fig. 8 is characterized by the fact that a metal tube or pipe 58 is cut or slotted in its top and intermediate its ends to provide the slots or grooves 59 and windows or apertures 60, respectively. Members 35 are provided as in Fig. 4 by inserting the structure of Fig. 4 bodily into tube or pipe 58 or by casting, welding, etc. operations as will be understood to form or build up members 35 in place therein. Similarly, members 35 are formed at or inside windows 60 in the tube or pipe and the interlocking members 33 are provided as before. Depending portions 17 can be utilized or not as desired.

In Figs. 9 and 9a a form of the invention is illustrated which has a variety of uses and further or additional uses as compared with previously described modifications. The construction of Figs. 9 and 9a consists of a set of members, part of which is constituted of upright or receiving members and part of which is constituted of interlocking members. The receiving members take at least two forms, that shown at 61 and that shown at 61a, the difference between the two forms being that the latter has additional cut away portions intermediate its ends, although it is to be understood that any of these receiving members can be cut away in any one or more places as is shown or as will be understood from preceding modifications. The interlocking members generally comprise two forms also, that shown at 62 and that shown at 62a. The former is in the nature of a rail, strip or bar, the ends of which are each provided on one side with a flat bottomed groove 63; the latter 62a has a body portion twice as thick as that of 62 and is provided at either or both ends with oppositely arranged flat bottomed grooves 63a and optionally with a hole 64 beyond the grooves. Members 62a are constructed similarly to members 11 as will be appreciated. I find it desirable to provide one of the interlocking members 62' in the form of a plug or starting piece which co-operates with a locking member 62 as shown in the upper right of Fig. 9.

It will be understood that these members can be built up into a variety of ultimate forms or objects in the nature of display racks, skeletons or frameworks for temporary shelters and that also the invention provides a very desirable set of toys or blocks which can be used for amusement or educational purposes in building up many different forms and structures. As shown at 65 & 70 shelf or other member or a plurality thereof may be associated with any of these built-up structures and I wish to point out that the utility and variety of articles formed or constructed from such a set of members which may be constituted of any total number is limited only by the imagination and ingenuity of the user thereof.

It will therefore be understood that one or another of the various types of connections hereinabove described can be applied to a wide variety of purposes or uses. In addition to such which have been directly or indirectly referred to above, I have discovered that furniture, fixtures and equipment having some or all of their joints made in accordance with the foregoing provide for the storing or transporting of the same in a limited space which is only a fraction of the space required for completely assembled articles. This would also have the advantage in reducing freight and insurance rates and at the same time diminish the liability to damage, since much more compact and satisfactory bundling, packaging, stacking or storing is permitted. My invention too is useful for producing knock-down skeletons or framework for garages, lunch wagons, shelters of various types, sales stands, emergency camps and tourist camps, as well as for many different articles used in the household, factory, the store, the shop and the office. I wish it furthermore understood that one or another of the modifications disclosed can be used for erecting partitions of various types and as manual training projects in which latter case the structure would be only partly completed, that is, only partly cut away, the balance thereof being indicated by suitable stenciling or marking so that the completed articles can be worked out by appropriate use of tools and then various forms and structures made therefrom. When interlocking members 62a are provided with holes 64 at the ends thereof these holes are utilized for the purpose of inserting a guy wire or guy rope, for example in those cases where such structures are made that it is necessary or desirable to attach them to the ground or to some other member, in which event the opposite end of said guy wire or guy rope is suitably secured as will be understood. This is particularly useful in connection with the structures which, due to their nature or location, may need such auxiliary means to hold them firmly in position or to constitute a semi-permanent structure. This is a matter, however, which is optional and which depends upon the circumstances of each case.

The foregoing is intended more as illustrative than as limitative and I may make suitable additions, omissions, variations and substitutions so long as such fall within the principles and terms of the appended claims which are rather to be considered as definitive of the scope of the invention.

Having thus described my invention, what I claim as new and desire to secure by Letters Patent is:

1. An interlocking joint construction comprising a receiving member and a plurality of interlocking members, said receiving member being cut away in its upper end to provide in effect a plurality of rabbeted slots disposed at right angles to each other and said interlocking members being so constructed that they interfit with each other and with said receiving member and when assembled in effect provide a solid receiving member with a plurality of integral extensions, each such interlocking member being provided with recesses and depending portions which in assembled position protect and cover certain of the visible joints.

2. An interlocking joint construction comprising a receiving member provided intermediate its ends with cut away portions extending entirely through the member and a plurality of rabbeted corner posts below said cut away portions and defining two slots at right angles to each other and a plurality of interlocking members the vertical height of which is not greater than said cut away portions and which are equal in depth and complementary in configuration to said right-angled slots as defined.

3. In an interlocking joint construction of the kind described, an interlocking member of rectangular cross-section which is provided intermediate its ends with flat-bottomed recesses in opposite sides thereof and a longitudinal recess disposed at right angles to said first-named recesses, the limiting wall surfaces of which provide depending portions.

4. In an interlocking joint construction of the kind described, an interlocking member of rectangular cross-section which is provided intermediate its ends with flat-bottomed recesses in opposite sides thereof and a longitudinal recess disposed at right angles to said first-named recesses, the limiting wall surfaces of which provide depending portions, said member being further provided in the flat-bottomed recessed portions with a vertical slot extending from the bottom thereof to a point short of the top thereof.

5. In an interlocking joint construction of the kind described, an interlocking member of rectangular cross-section which is provided intermediate its ends with flat-bottomed recesses in opposite sides thereof and a longitudinal recess disposed at right angles to said first-named recesses, the limiting wall surfaces of which provide depending portions, said member being further provided in the flat-bottomed recessed portions with a vertical slot extending from the top thereof to a point short of the bottom thereof.

6. In an interlocking joint construction of the kind described, a receiving member in the form of an upright, said upright being provided with a plurality of longitudinally spaced cut away portions at least one of which is located intermediate the ends each of which is capable of forming a joint, each such cut away portion being defined by four corner posts having a cross-section in the form of two diamonds with a common apex thereby defining two slots or grooves at each point which are disposed at right angles to each other, the intermediate of said joint forming portions being provided with free space for the passage therethrough of co-operating interlocking members.

7. A joint construction of the character described comprising a receiving member an end of which is provided with a slot passing therethrough which is wider at its ends than intermediately and at least one interlocking member complementary to said receiving member and having portions of such thickness and configuration as to fill the slot of said receiving member and having additional portions extending appreciably below the bottom of such slot.

8. A joint construction of the character described comprising a receiving member an end of which is cut away to provide four corner posts which define two slots passing through the end of the receiving member at right angles to each other, each such corner post having its cross-section in the form of two substantially equal diamonds arranged apex to apex having a common apex whereat they merge, thus forming rabbets on each side of each corner post substantially midway thereof, and a plurality of interlocking members adapted to interfit with each other and with the receiving member and having shoulders adapted to interlock with said rabbets in said corner posts, the material of said interlocking members between said shoulders being free from surface irregularities.

9. A joint construction of the character described comprising a receiving member an end of which is cut away to provide four corner posts which define two slots passing through the end of the receiving member at right angles to each other, each such corner post having its cross-section in the form of two substantially equal diamonds arranged apex to apex having a common apex whereat they merge, thus forming rabbets on each side of each corner post substantially midway thereof, and a plurality of interlocking members adapted to interfit with each other and with the receiving member and having shoulders adapted to interlock with said rabbets in said corner posts, each interlocking member being recessed and uni-planar between its shoulders and having a slot extending about halfway of said uni-planar portion.

ANTON YURKOVITCH.